United States Patent [19]

Burdorf et al.

[11] 4,023,748

[45] May 17, 1977

[54] CASSETTE LOADING AND TAPE TENSIONING SYSTEM

[75] Inventors: Donald L. Burdorf, Newport Beach; Gerhard Rotter, Mission Viejo; Harold E. Arns, Chino, all of Calif.

[73] Assignee: BASF Aktiengesellschaft, Ludwigshafen (Rhine), Germany

[22] Filed: May 3, 1976

[21] Appl. No.: 682,650

Related U.S. Application Data

[63] Continuation-in-part of Ser. No. 498,446, Aug. 19, 1974.

[52] U.S. Cl. .............................. 242/192; 242/195
[51] Int. Cl.² .................. G11B 15/32; G11B 15/66
[58] Field of Search ............... 242/192, 195, 198; 352/157, 158; 360/95; 226/91, 92

[56] References Cited

UNITED STATES PATENTS

| | | | |
|---|---|---|---|
| 3,750,976 | 8/1973 | Bondschuh et al. | 242/192 |
| 3,921,933 | 11/1975 | Rotter et al. | 242/192 |
| 3,980,253 | 9/1976 | Burdorf et al. | 242/192 |

*Primary Examiner*—Leonard D. Christian
*Attorney, Agent, or Firm*—Johnston, Keil, Thompson & Shurtleff

[57] ABSTRACT

A system for automatically loading and tensioning a supply reel of magnetic recording which is contained in a tape cassette. The system is designed to be utilized with a tape transport mechanism of the type wherein the supply reel is driven by surface engagement of the outermost layer of tape on the reel with a capstan. A motor driven leadscrew mechanically engages the tape transport apparatus and functions as a means for sequencing its operation in a manner so that upon loading, the normally-closed cassette is opened and the tape pack is advanced by the transport apparatus into an operative position in which it is in contact with the capstan. Following the threading of the tape about the take-up reel, the leadscrew causes the transport apparatus to withdraw the supply tape pack from close contact with the capstan in order to allow slack to be removed therefrom through the action of a brake upon the supply reel. The supply tape pack is then once again brought back into its operative position in contact with the capstan.

29 Claims, 8 Drawing Figures

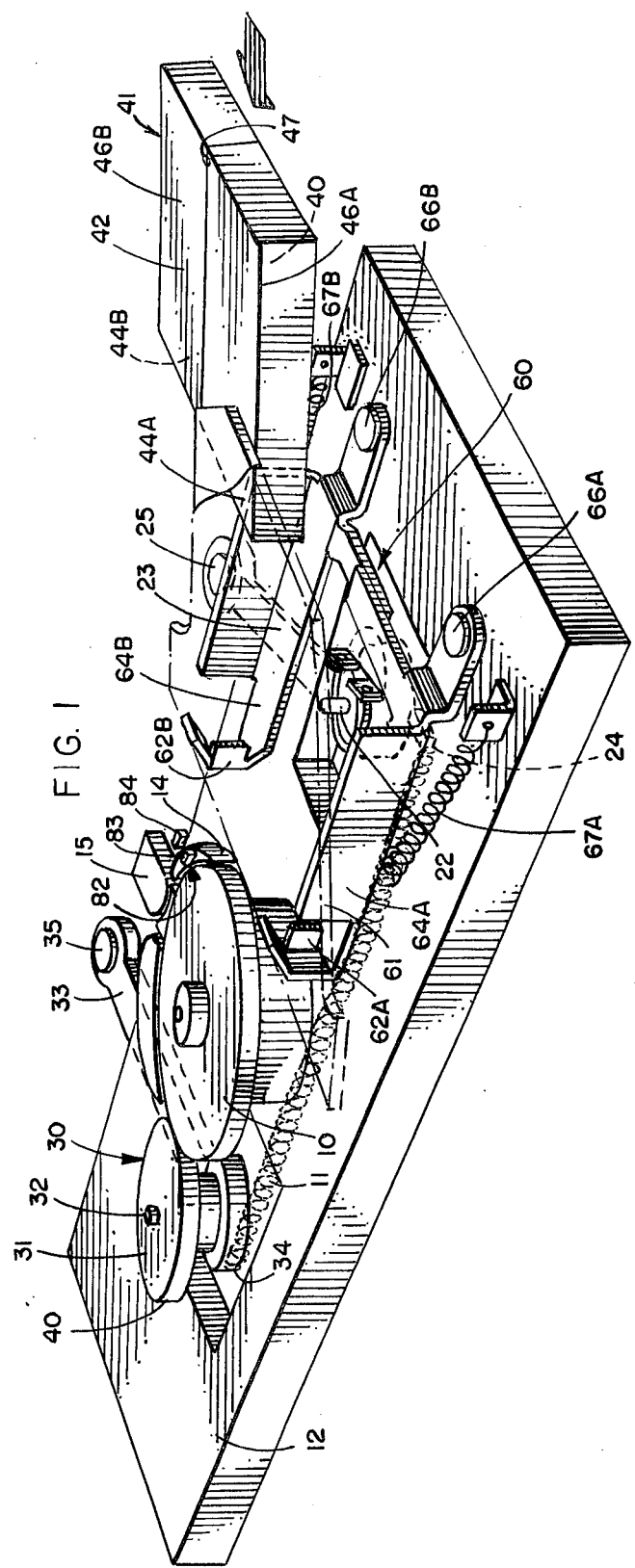

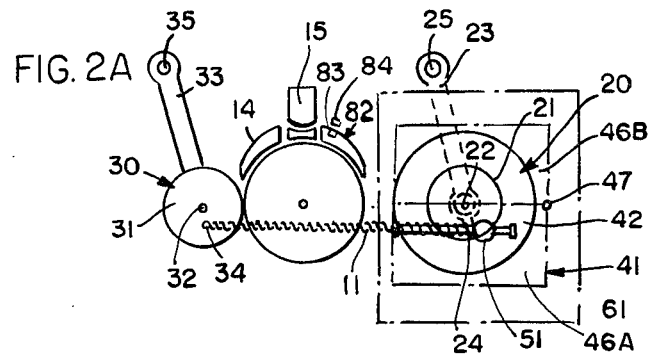
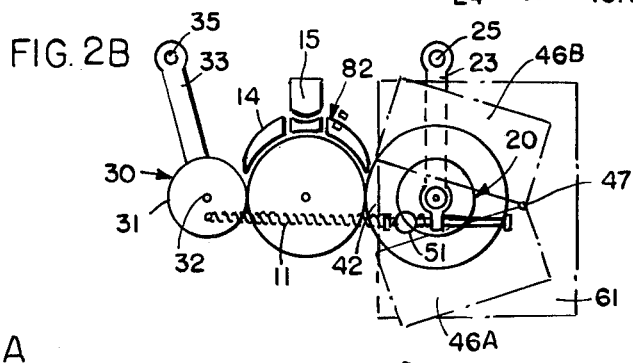
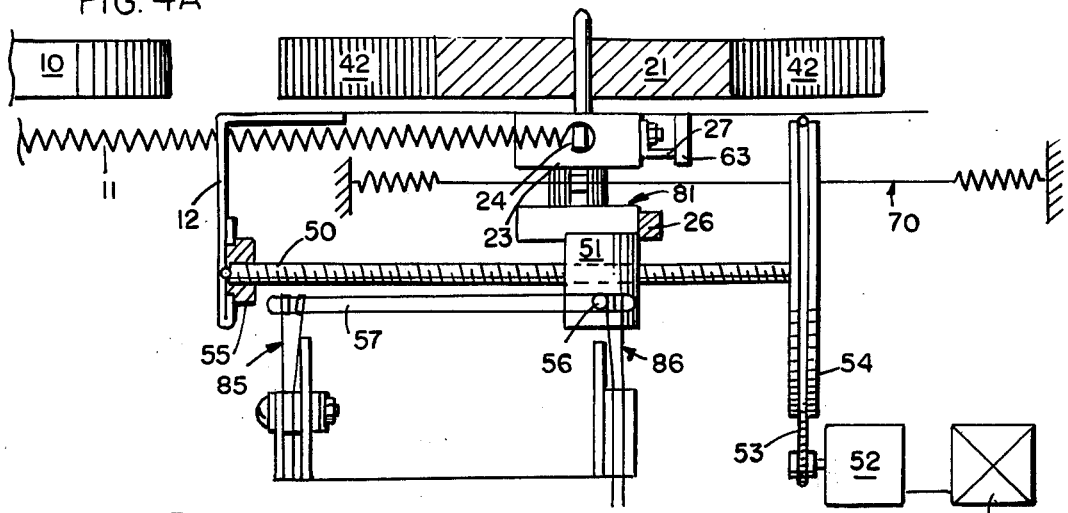
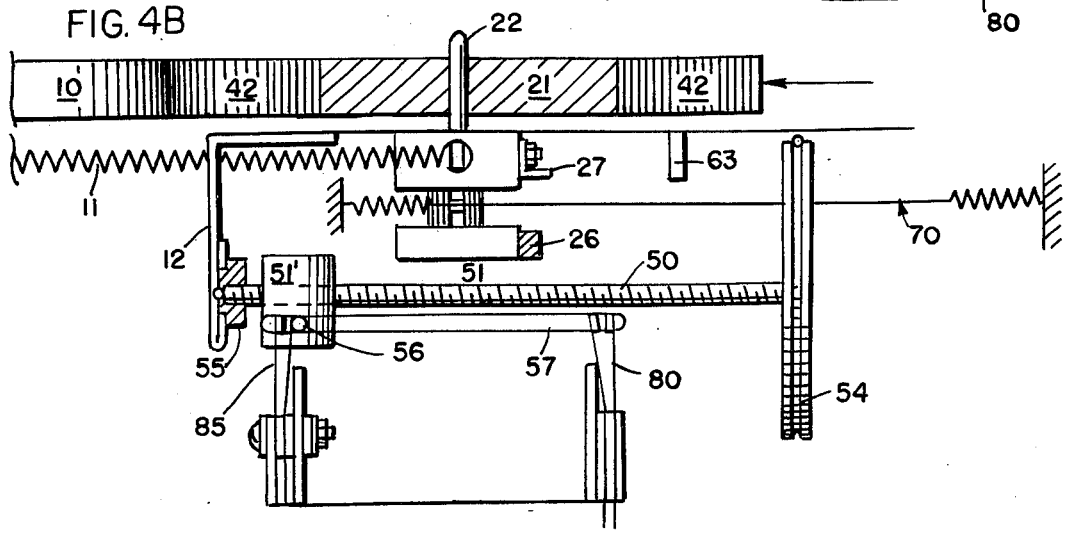

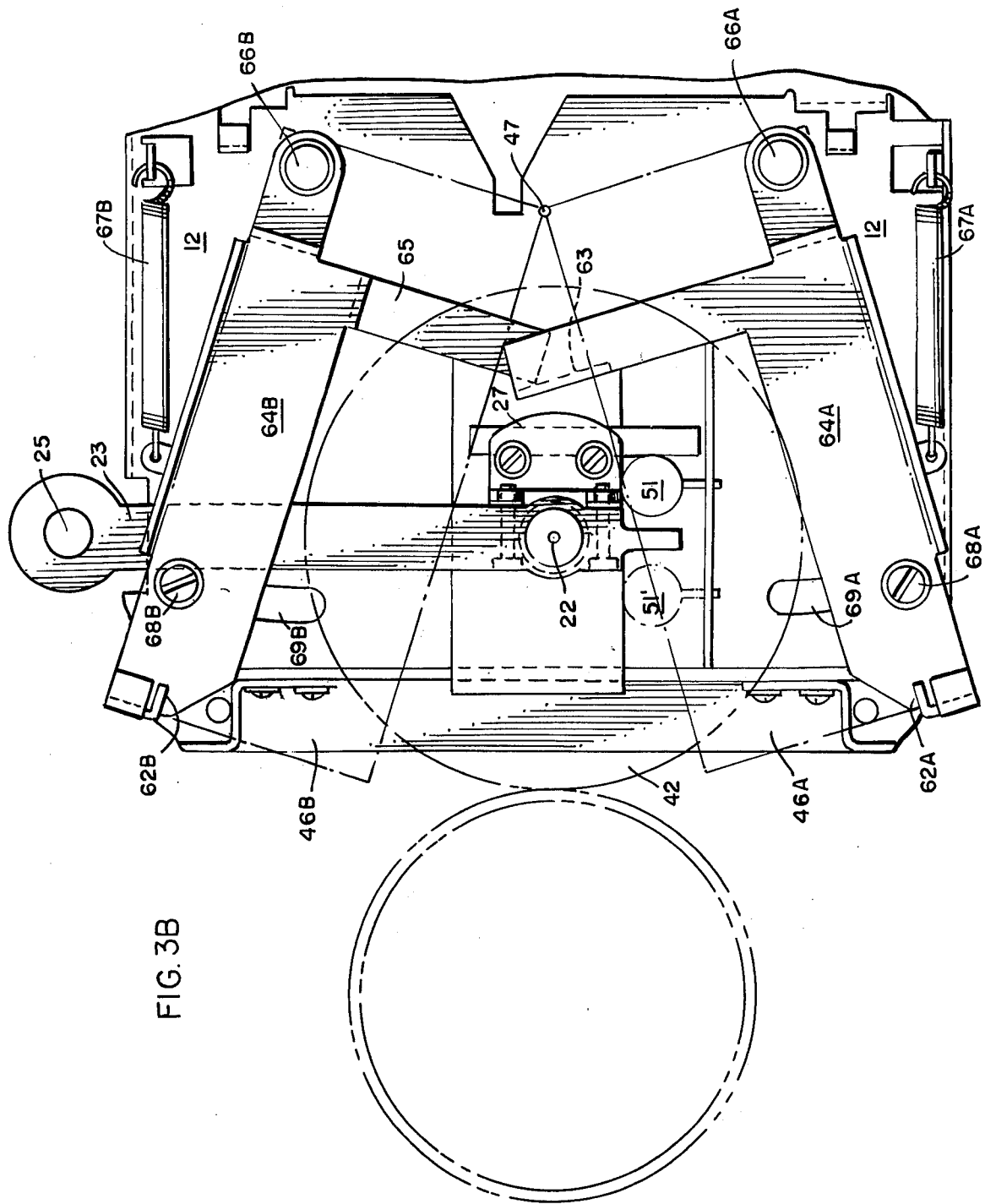

CASSETTE LOADING AND TAPE TENSIONING SYSTEM

INTRODUCTION

This is a continuation-in-part of application Ser. No. 498,446, filed Aug. 19, 1974. The present invention relates generally to a tape transport mechanism and, more particularly, to a system for automatically loading and tensioning a supply reel of magnetic recording tape contained in a tape cassette. The system is designed to be utilized with a tape transport mechanism of the type wherein the supply reel is driven by surface engagement of the outermost layer of tape on the reel with a capstan.

BACKGROUND OF THE INVENTION

Many variations of tape transport mechanisms are known and used in the magnetic recording industry wherein the supply reel is driven by surface engagement with a capstan. In certain of such systems a tape cassette is utilized to protect the supply tape pack. In operation, the cassette is inserted into a receiving means and the tape pack hub is brought into engagement with a shaft which is part of the transport mechanism. The supply tape pack is then caused to come into contact with the capstan and threading of the tape about the take-up reel begins. In addition, some means is generally used to remove any slack in the supply tape pack resulting from the threading operation.

With such known systems, the supply tape pack loading, threading and tensioning operations are accomplished by numerous differing means. It has been found, however, that the complex mechanical and electronic systems heretofore utilized to control the loading, threading and tensioning steps have resulted in many problems relating to their reliability and high cost which have prohibited their practical use in the home entertainment field.

The present invention was developed in order to provide a simple and relatively inexpensive system which controls and sequences the loading, threading and tensioning steps through the inter-action of a minimum of simple mechanical parts and the utilization of a simple and reliable electronic system which makes multiple use of many circuit elements which are necessary for other transport functions.

BRIEF DESCRIPTION OF THE INVENTION

The present invention provides a simple and relatively inexpensive cassette loading and tape tensioning system which is designed to be utilized with a transport mechanism in which the tape supply pack is wound from a hub secured to a rotatable shaft mounted on a carriage means. The carriage may be either of a linear movement type or a swing-arm movement type wherein it is urged toward a capstan which drives the tape pack through surface engagement of the outermost tape layer of the pack. As the diameter of the supply pack decreases or increases in use, the design of the carriage allows for movement of the hub toward or away from the capstan.

With the tape transport mechanism utilized in the present invention, the supply tape pack may be contained in a hinged, normally-closed tape cassette. The cassette is loaded into a receiving means and the supply pack hub is secured to a shaft mounted on the supply carriage. At this point, a locking means holding the halves of the cassette closed is released and the cassette is ready to be opened by pivotal arms engaging the forward portion of each cassette half thereby allowing the supply tape pack to be advanced into contact with the capstan.

Once the cassette is opened and the supply tape pack is advanced into contact with the capstan, the tape is threaded around the capstan and about the take-up reel, by means of a tape threading apparatus such as that disclosed in application Ser. No. 498,466, filed Aug. 19, 1974. Following the threading operation, the supply tape pack is withdrawn slightly from close contact with the capstan in order that slack may be removed therefrom. Once this is accomplished, the supply tape pack is once again brought back into its operative position in contact with the capstan.

All of the above steps are controlled by means of an unique motor-driven leadscrew system which mechanically engages the supply carriage. The leadscrew functions as a sequencing means which regulates the timing of each step of the tape loading and tensioning system. Its operation is regulated by a simple logic circuit which receives electronic signal inputs from various circuit elements which are also used for other transport functions.

DESCRIPTION OF THE DRAWINGS

FIG. 1 is a perspective view of a cassette loading and tape tensioning system constructed in accordance with an embodiment of the present invention;

FIG. 2A is a top plan view of the apparatus shown in FIG. 1;

FIG. 2B is a top plan view similar to FIG. 2A, but showing several elements thereof in a different sequential position;

FIG. 3B is a partial, enlarged top plan view similar to FIG. 3A, but showing several elements thereof in the sequential position illustrated in FIG. 2B;

FIG. 4A is a sectional side view taken along line A—A of FIG. 3A;

FIG. 4B is a sectional side view similar to FIG. 4A, but taken along line B—B of FIG. 3B;

DESCRIPTION OF THE PREFERRED EMBODIMENT

Figure 3A:
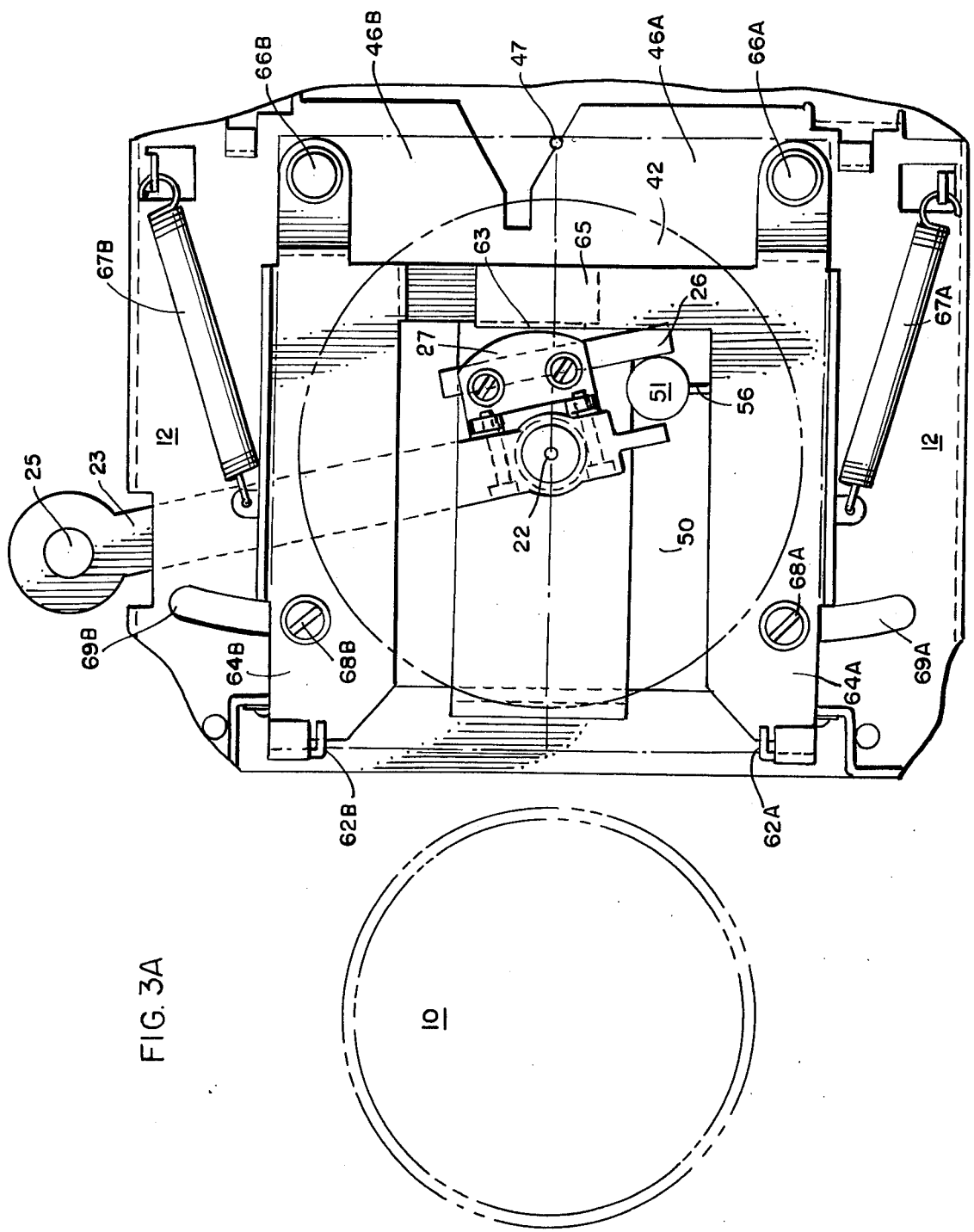
FIG. 3A is a partial enlarged top plan view of the apparatus shown in FIG. 2A.
Figure 5:
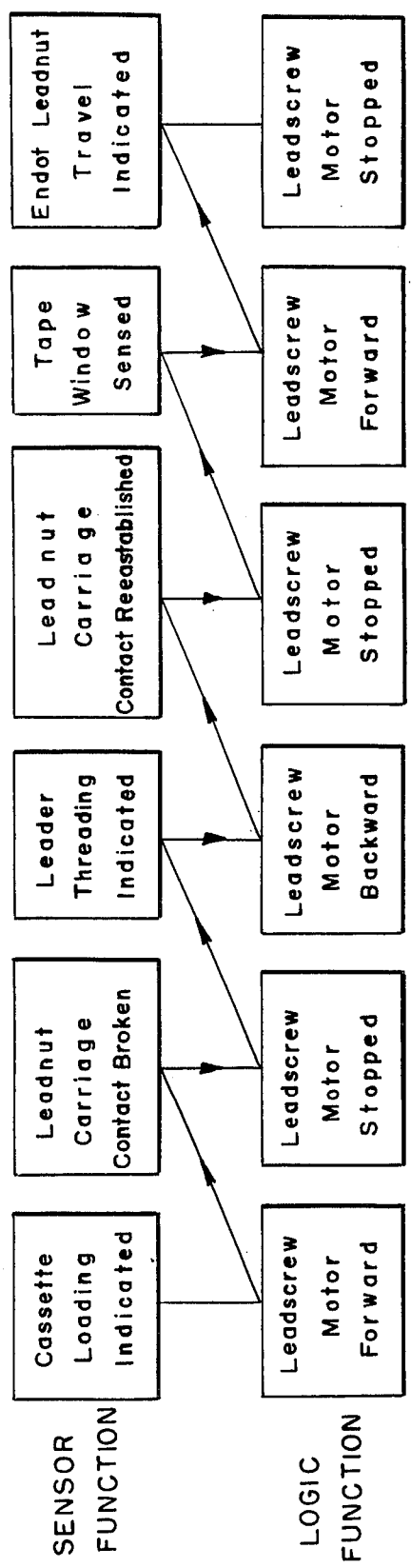
FIG. 5 is a block diagram showing the sequence of the loading and tensioning operations.
Figure 6:
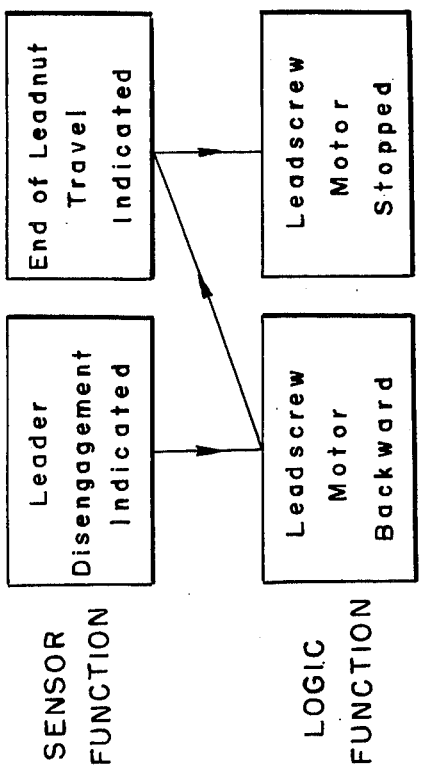
FIG. 6 is a block diagram showing the sequence of the supply tape pack unloading operation.

FIG. 1 generally illustrates an embodiment of a cassette loading and tape tensioning system constructed in accordance with the present invention. The system is shown being utilized with a tape transport mechanism having a capstan 10 which simultaneously drives supply reel 20 and take-up reel 30 by surface engagement of the outermost layer of magnetic tape 40 on each reel.

Referring now also to FIGS. 2A, 2B, supply reel 20 comprises hub 21 secured to rotatable shaft 22 mounted on swing-arm carriage 23. Similarly, take-up reel 30 comprises hub 31 secured to rotatable shaft 32 mounted on swing-arm carriage 33. Carriages 23,33 individually urge supply and take-up reels 20,30 inward against capstan 10 by means of a constant tension spring 11 which interconnects the carriages at points 24,34. In this manner, as the diameter of the tape pack wound about each reel varies in use as tape 40 is transported past record/playback head 15, the carriages will rotate about pivot points 25,35 so as to allow for independent movement of the reel hubs toward or away from the capstan.

The first operation in the loading process consists of inserting hinged cassette 41, in which supply tape pack 42 wound about hub 21 is stored, into cassette receiving means 60. Receiving means 60 comprises a hinged door 61 (shown in phantom lines) which is located in such a position that snapping it closed will urge hub 21 onto supply shaft 22. Tabs 62A,62B located respectively on the ends of pivotal arms 64A,64B will enter slots 44A,44B located in the forward portion of cassette halves 46A,46B and release the internal cassette locking mechanism (not shown) holding the halves of the cassette closed. When this is accomplished, the cassette halves are ready to be pivoted open about pivot point 47 in a manner such that the supply tape pack may be advanced into contact with the capstan.

Supply tape pack 42 is advanced into an operative position wherein its outermost tape layer is in close contact with capstan 10 by means of the pivotal motion of supply carriage 23 which is urged toward the capstan by constant tension spring 11.

FIGS. 2, 3 and 4, best illustrate a means for sequencing the operation of the tape transport apparatus which comprises a threaded, rotatable leadscrew 50 having a corresponding internally threaded nut 51 mounted for translational movement thereon. Leadscrew 50 is rotated by means of motor 52 acting through belt 53 and pulley 54 attached to one end of the leadscrew. The other end of the leadscrew is rotatably secured to the transport frame 12 through bearing 55.

Nut 51 has a circular cross-section with the internally threaded portion through which the leadscrew extends formed perpendicular to its axis. The nut is prevented from rotating about the leadscrew as it is rotated due to a pin 56 extending therefrom which slides along slot 57, which is formed in the frame of the transport, as the nut traverses back and forth across the leadscrew.

Due to the pivotal force exerted by constant tension spring 11, the supply carriage will be urged against nut 51 at carriage projection 26. Hence, as nut 51 traverses toward and away from the capstan, it will also control the movement of supply carriage 23 and tape pack 42 toward and away from the capstan.

Referring now to the system for opening the hinged cassette 41, supply carriage 23 has a rounded plate 27 mounted slightly above carriage projection 26 which mechanically engages flange portion 63 of pivot arm 64A. Extension 65 of pivot arm 64B is urged against the other side of the flange, which in turn is urged against carriage plate 27, by means of the pivotal force exerted on the arms by springs 67A,67B. Hence, as carriage 23 advances toward the capstan, arms 64A,64B will pivot about their respective pivot points 66A,66B in a manner so as to cause the halves of cassette 41 to pivot open about their hinge 47.

In operation, once cassette 41 is loaded in the transport mechanism in the manner described above, leadscrew motor 52 is activated thereby rotating leadscrew 50 is a forward direction wherein nut 51 will traverse across the leadscrew toward capstan 10. This beginning position of the loading sequence is illustrated by FIGS. 2A, 3A and 4A.

As the nut traverses toward the capstan, supply carriage 23 will cause the tape pack 42 to advance toward the capstan as carriage projection 26 follows nut 51. As the supply carriage moves toward the capstan, arms 64A,64B will be allowed to pivot outwards, thereby opening the cassette 41 about its pivot point 47 sufficiently to allow tape pack 42 to come into contact with the capstan. At this point, the opening of the cassette will cease as limit pins 68A,68B mounted on the arms reach the end of their travel in pivot slots 69A,69B respectively.

When tape pack 42 is brought into contact with capstan 10, as is illustrated in FIGS. 2B, 3B and 4B, nut 51 will stop its travel toward the capstan due to the activation of logic circuit 80 which electrically controls the operation of the leadscrew motor 52. Logic circuit 80 consists of conventional AND, OR, NAND and NOR gates and FLIP-FLOPS which control the start, stop, and forward-backward motion of the leadscrew motor, which in turn controls the movement of nut 51 across leadscrew 50, in response to electrical signals generated by several simple signaling means.

The first of these signaling means 81 indicates when the tape pack comes into contact with the capstan. Signaling means 81 is essentially a contact switch comprising on one side of the circuit, leadscrew nut 51 and, on the other side of the circuit, carriage projection 26. As is best illustrated by FIG. 4B, when tape pack 42 comes into contact with capstan 10, the movement of supply carriage 23 will be blocked as nut 51 continues to traverse towards the capstan. Thus, the engagement of the tape pack by the capstan will necessarily cause the contact between carriage projection 26 and nut 51 to be broken. Since these two elements are also acting as respective sides of an electrical circuit switch, this circuit also will be broken as the leadscrew nut continues to be driven toward the capstan, which in turn will signal the logic circuit to stop the leadscrew motor.

After the leadscrew motor is stopped as a result of the tape pack coming into contact with the capstan, the logic circuit causes the capstan to rotate and thereby begin the threading of the tape about the capstan and take-up reel 30. One apparatus and method for accomplishing this threading operation is described in detail in U.S. patent application Ser. No. 498,446, filed Aug. 19, 1974, and will not be further described herein.

A second signaling means 82 indicates when the threading operation is completed. This signaling means consists of a photosensor 83 which is responsive to a light source 84 which is disposed on the opposite side of the path followed by the tape about capstan tape guide 14. This arrangement permits, by the use of a transparent leader in conjunction with opaque recording tape, the sensing of the leader-tape junction by the photosensor. In addition, the removal of the opaque recording medium from a portion of the transparent tape base will also cause a signal to be generated when this washout passes between the photosensor and light source. It is desirable that the length of the transparent leader or the distance between the tip of the leader and the washout be sufficient to assure that the threading operation has been performed properly before the photosensor signal is generated.

When the photosensor circuit signals that the tape threading operation has been satisfactorily completed, the logic circuit will cause the leadscrew motor to reverse, thereby causing nut 51 to once again come into contact with carriage projection 26 and begin driving tape pack 42 backwards, away from capstan 10. At this point, electrical contact between nut 51 and projection 26 is reestablished, thereby generating a signal to the logic circuit which will in turn cause the leadscrew motor to stop. The inherent overrun of nut 51 should be sufficient to withdraw the supply tape pack from close contact with the capstan in order to allow for slack removal. However, an appropriate delay timing sequence may be built into the logic circuit to allow for such withdrawal if the inherent nut overrun is insufficient to provide for this operation.

Once the above-mentioned close frictional contact between capstan 10 and tape pack 42 is broken, the slack removal operation begins through the operation of a brake 70 acting upon the supply reel shaft 22. Brake 70 consists essentially of a flexible cord which is wrapped several times about the lower end of shaft 22 in order to provide a frictional bearing contact therewith, and which is resiliently attached at its ends to the transport frame 12. The drag upon shaft 22 by brake 70 will cause all slack to be removed from the tape transport system as take-up reel 30 and capstan 10 pull the tape off of tape pack 42 under the tension caused by brake 70 once close frictional contact between the tape pack and capstan is broken. Once this contact is broken, the slack removal operation is completed very quickly and the logic circuit will once again cause the leadscrew motor to drive nut 51 in a forward direction thereby bringing tape pack 42 back into its operative position in close contact with capstan 10.

The completion of the slack removal operation may be indicated by a simple timing arrangement such as locating another washout or transparent tape window a certain distance from the beginning of the tape. (For example, in one embodiment of the present invention such a washout is already located 34 inches from the beginning of the tape and is primarily utilized to control the rewind operation of the tape.) When the above-described photosensor circuit signals the appearance of this washout to the logic circuit, it will cause leadscrew motor 52 to drive nut 51 and following carriage projection 26 forward until close contact between tape pack 42 and capstan 10 is reestablished. At this point nut 51 will continue to be driven along leadscrew 50 until the end of its travel is indicated by engagement of limit switch 85. (See the nut position indicated as 51' in FIGS. 3B, 4B.) The closing of limit switch 85 will signal the logic circuit to stop the leadscrew motor, which in turn will stop the travel of nut 51. In the embodiment of the invention shown in the drawings, the distance nut 51 must be driven along leadscrew 50 after the tape pack engages the capstan must be sufficient to allow for free clearance of carriage projection 26 with respect to nut 51 as the tape pack is exhausted from hub 21 in use.

When it is desired to unload the tape cassette from the tape transport, the above loading sequence is reversed in the following way. After the tape and leader have been fully rewound onto tape pack 42, photosensor circuit 82 will generate a signal in the above-discussed manner indicating that the end of the tape has passed due to the washout that will be created thereby. This signal causes the logic circuit to begin driving the leadscrew motor backwards, thereby causing nut 51 to traverse the leadscrew away from the capstan. As nut 51 so traverses across leadscrew 50, it will once again engage carriage projection 26 thereby causing tape pack 42 to retract away from the capstan and back into its cassette which will be mechanically closed about it through the reverse operation of pivot arms 64A, 64B which engage cassette halves 46B.

The completion of the tape pack unloading operation is indicated by the engagement of limit switch 86 by nut 51 at the outer end of its travel along leadscrew 50 (See FIG. 4A). The closing of this outer limit switch will signal the logic circuit to stop the leadscrew motor, which in turn will stop the travel of nut 51. At this point hinged door 61 may be opened and the cassette containing tape pack 42 removed from the cassette receiving means.

While several particular embodiments of the present invention have been shown and described, it should be understood that various obvious changes and modifications thereto may be made, and it is therefore intended in the following claims to include all such modifications and changes as may fall within the spirit and scope of this invention.

What is claimed is:

1. A cassette loading and tape tensioning system for use with a tape transport mechanism having a take-up reel and a carriage mounted supply reel which is driven by surface engagement with a capstan, the tape pack on the supply reel being contained in a cassette, said system comprising:

means for opening the tape cassette sufficiently to expose the supply tape pack for engagement by the capstan;

means for advancing said supply tape pack into an operative position wherein its outermost tape layer is in close contact with said capstan;

means for threading said tape around said capstan and about the take-up reel;

means for withdrawing said supply tape pack from close contact with said capstan;

means for removing tape slack from said supply tape pack; and means for sequencing the operation of said cassette opening, tape pack advancing, withdrawing and slack removal means so that said cassette is opened as said tape pack is advanced into close contact with the capstan, said tape then being threaded about said take-up reel after which said tape pack is caused to be withdrawn from close contact with the capstan so that slack may be removed therefrom through the action of said slack removal means, said tape pack then being caused to advance again into its operative position in close contact with the capstan.

2. The system of claim 1 wherein a portion of said sequencing means mechanically engages said advancing means as said tape pack advances towards the capstan and disengages said advancing means when said tape pack comes into close contact with the capstan thereby causing said threading operation to begin.

3. The system of claim 1 wherein the cassette opening means comprises an arm which engages the opening portion of said cassette and which mechanically engages said tape pack advancing means so that the opening of said cassette is controlled thereby.

4. The system of claim 1 wherein the cassette opening means comprises a pair of arms which engage the opening halves of said cassette at the side corner portions thereof located on either side of the hinge point of said cassette, said pair of arms also mechanically engaging said tape pack advancing means so that said cassette halves pivot open simultaneous with the advancing of the tape pack toward the capstan.

5. The system of claim 1 wherein the slack removal means comprises a brake acting on said supply reel.

6. The system of claim 1 wherein the tape pack advancing means comprises a carriage which is movable toward and away from said capstan and which mechanically engages said sequencing means so that its movement is controlled thereby.

7. The system of claim 6 wherein the tape pack withdrawing means comprises said movable carriage.

8. The system of claim 7 wherein the sequencing means comprises an actuating means which mechanically engages and controls the movement of said carriage towards and away from said capstan.

9. The system of claim 8 wherein the actuating means comprises a motor-driven, rotatable leadscrew having a nut mounted thereon which is driven transversely as said leadscrew is rotated, said nut mechanically engaging and controlling the movement of said carriage.

10. The system of claim 9 wherein the sequencing means further comprises a first means for signaling when said tape pack is brought into contact with said capstan and a second means for signaling when said tape is threaded about said take-up reel.

11. The system of claim 10 wherein the sequencing means further comprises a logic circuit which controls the operation of said motor-driven leadscrew and which receives electronic input signals from said signaling means.

12. The system of claim 11 wherein the logic circuit comprises a means for causing said leadscrew motor to rotate said leadscrew in a forward direction wherein said nut will traverse toward said capstan, thereby causing said movable carriage to advance said tape pack toward said capstan which, in turn, causes said cassette opening means which mechanically engages said movable carriage to open said cassette, said leadscrew motor being operated until said first signaling means indicates that said tape pack is in contact with said capstan.

13. The system of claim 12 wherein the logic circuit further comprises a means for activating said threading means when said first signaling means indicates that said tape pack is in contact with said capstan.

14. The system of claim 13 wherein the logic circuit further comprises a means for causing said leadscrew motor to rotate said leadscrew in a backward direction wherein said nut will traverse away from said capstan, thereby causing said movable carriage to withdraw said tape pack from close contact with said capstan, when said second signaling means indicates that said tape is threaded about said take-up reel.

15. The system of claim 14 wherein the logic circuit further comprises a means for stopping the backward rotation of said leadscrew motor when said first signaling means indicates that said tape pack has been withdrawn from close contact with said capstan.

16. The system of claim 15 wherein the logic circuit further comprises a timing means which causes said leadscrew motor to rotate said leadscrew in a forward direction wherein said nut will traverse toward said capstan, thereby causing said movable carriage to advance said tape pack again into its operative position in close contact with the capstan, after a period of time has elapsed sufficient to allow slack to be removed from said tape pack.

17. The system of claim 16 wherein the sequencing means further comprises an inner limiting means for signaling when said nut has traversed toward said capstan a distance sufficient that it will not interfer with the movement of said carriage as said tape pack is exhausted in use.

18. A system of claim 17 wherein the logic circuit further comprises a means for stopping the forward rotation of said leadscrew motor when said inner limit signaling means is engaged by said nut.

19. The system of claim 18 wherein the sequencing means further comprises a means for signaling when the tape has been fully rewound onto said tape pack.

20. A system of claim 19 wherein the logic circuit further comprises a means for causing said leadscrew motor to rotate said leadscrew in a backward direction wherein said nut will traverse away from said capstan, thereby causing said movable carriage to withdraw said tape pack from contact with said capstan and back within said cassette which is closed about it by the reverse operation of said cassette opening means when said rewind signaling means is activated.

21. The system of claim 20 wherein the sequencing means further comprises an outer limiting means for signaling when said nut has traversed away from said capstan a distance sufficient that said tape pack has fully withdrawn back within said closed cassette.

22. The system of claim 21 wherein the logic circuit further comprises a means for stopping the backward rotation of said leadscrew motor when said outer limit signaling means is engaged by said nut.

23. The system of claim 10 wherein the first signaling means comprises a contact switch having as one side of the circuit said leadscrew nut and as the other side of the circuit said carriage.

24. The system of claim 10 wherein the second signaling means comprises a photosensor circuit having a photosensor located on one side of the path followed by the tape about said capstan which is responsive to a light source disposed on the other side thereof.

25. The system of claim 24 wherein the second signaling means further comprises a washout, located at the beginning of said tape, which activates said photosensor circuit when said tape is threaded about said take-up reel.

26. The system of claim 16 wherein the timing means comprises a washout, located on said tape a predetermined distance from the beginning thereof, which activates said photosensor circuit after a period of time has elapsed sufficient to allow slack to be removed from said tape pack.

27. The system of claim 17 wherein the inner limit signaling means comprises a first limit switch which is engaged by said nut at the inner limit of its travel along said leadscrew toward said capstan.

28. The system of claim 19 wherein the rewind signaling means comprises said second signaling means.

29. The system of claim 21 wherein the outer limit signaling means comprises a second limit switch which is engaged by said nut at the outer limit of its travel along said leadscrew away from said capstan.

* * * * *